Sept. 27, 1955 W. LULOFS 2,719,186
SUPERHETERODYNE RECEIVER FOR FREQUENCY-SHIFT TELEGRAPHY
COMPRISING AUTOMATIC FREQUENCY CORRECTION
Filed Sept. 25, 1952
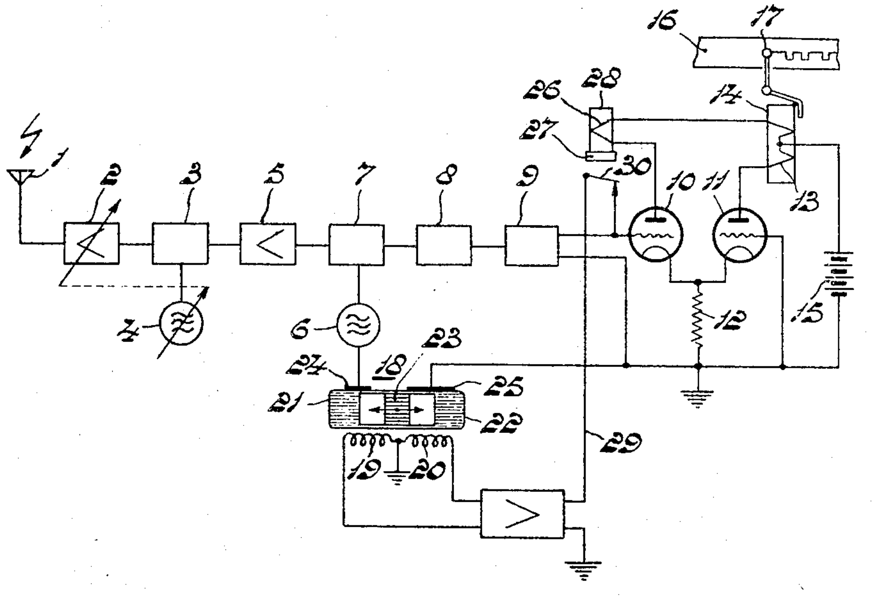
INVENTOR
WARNER LULOFS
BY Fred M Vogel
AGENT 2,719,186

SUPERHETERODYNE RECEIVER FOR FREQUENCY-SHIFT TELEGRAPHY COMPRISING AUTOMATIC FREQUENCY CORRECTION

Warner Lulofs, Hilversum, Netherlands, assignor to Hartford National Bank and Trust Company, Hartford, Conn., as trustee Application September 25, 1952, Serial No. 311,394

Claims priority, application Netherlands October 11, 1951

5 Claims. (Cl. 178—69)

This invention relates to superheterodyne receivers for frequency-shift telegraphy, for example, for the reception of morse, telex or similar signals characterized by frequency shifts of an incoming carrier wave. It relates more particularly to such receivers comprising a local oscillator having a frequency corrector, to be controlled by an AFC-control voltage, for automatically bringing the tuned position of the receiver into conformity with the transmission frequencies of the telegraphy signals, the control voltage being derived from a tuned frequency detector yielding the demodulated signals.

In order to avoid unwanted variation in the tuning frequency of the receiver during signalling intervals, in which either the mark frequency or the space frequency occurs, several solutions are known, all of which lead to comparatively complicated circuits, and which involve a critical adjustment such as to bring about disturbance in operation.

The object of the invention is to obviate the above-described disadvantages by the use of a minimum number of additional parts to avoid unwanted variation in the tuning frequency of the receiver during signalling intervals, whereby variation in the magnitude of the frequency shift used does not require any variation in adjustment and furthermore the additional parts to be used need not satisfy any tolerance requirements which are objectionable in practice.

According to the invention, for this purpose the demodulated signals control a relay having a rest contact included in the AFC-control voltage lead, which relay is responsive with retardation and thus does not react upon the normal signalling frequency, while the frequency corrector is of the type without back-setting force and thus, when the AFC-control voltage lead is interrupted, retains the adjustment which then happens to exist.

Considering the conventional signalling speeds of, for example, about 50 Baud, the retardation in the response of the relay is chosen to be at least 10 microsecs., for example, between 20 and 50 microsecs., which is possible without further expedients by the use of a short-circuit winding on the relay.

The frequency corrector preferably comprises a reactance which is controlled by a regulating motor, the AFC-control voltage being supplied to the regulating motor as an energizing voltage.

In order that the invention may be more clearly understood and readily carried into effect, it will now be described in greater detail with reference to the accompanying drawing showing a receiver according to the invention for frequency-shift telegraphy which is of the double superheterodyne type.

The oscillation received by an aerial 1 is fed by way of a tunable high-frequency pre-amplifier 2 to a mixing stage 3, to which is also connected a tunable first local oscillator 4. The intermediate frequency oscillations derived from mixing stage 3 are supplied by way of a first intermediate frequency amplifier 5, which has a fixed tuning frequency, to a second mixing stage 7, to which is connected a second local oscillator 6 for the purpose of producing oscillations to be amplified in a second intermediate-frequency amplifier 8 which also has a fixed tuning frequency and which furthermore, functions as an amplitude limiter. The oscillations yielded by the second intermediate-frequency amplifier being limited in amplitude and varying in frequency in accordance with the signal modulation is fed to a tuned frequency detector 9 of the push-pull band-pass filter type which provides either a positive or a negative direct voltage depending on whether the mark frequency or the space frequency is received. The resultant demodulated signals are supplied for further amplification to a trigger circuit of a type known per se, comprising two triodes 10 and 11, respectively, having a common cathode resistor 12. In case of reception of the mark frequency and positive output voltage of the frequency detector 9, triode 10 conveys the full anode current and triode 11 is cut off; in case of reception of the space frequency and negative output voltage of the frequency detector 9, the trigger position is reversed and triode 11 is current-conveying, whereas triode 10 is cut off.

The anodes of the triodes 10 and 11 are connected in push-pull to an energizing winding 13 of a polarized relay 14, the center tap of said energizing winding being connected to ground by way of an anode voltage source 15. As shown diagrammatically, the relay 14 controls a recording pin 17 for reproducing the incoming signals, which pin is arranged above a moving recording band 16. Receivers for frequency-shift telegraphy of the type described hitherto are known.

For automatic correction of the tuning frequency of the receiver in accordance with the mean direct-current component of the demodulated signals, which varies with the mean carrier-wave frequency of the incoming signals, a frequency corrector 18 is coupled to the frequency-determining circuit of the local oscillator 6. Frequency corrector 18 comprises a variable condenser, the capacity of which is subject to the control of the aforementioned mean direct-current component of the demodulated signals. The signals derived from the frequency detector 9 are supplied by way of a push-pull direct-current amplifier to a regulating motor comprising energizing windings 19 and 20, of which either winding 19 or winding 20 is current-conveying dependent upon the reception of the mark frequency or the space frequency being received. The magnetic field of said windings acts upon the position of a piston-like metallic control member 22 which comprises a central soft iron ring 23 and which is movable in the direction of the axis of a glass tube 21 filled with liquid. Owing to the filling of the tube 21 with liquid, the damping of the movement of the control member 22 is such that the latter is not capable of following the signalling rhythm and can only occupy a position corresponding to the mean direct-current component of the signals when the windings 19 and 20 are alternately energized by the signals.

The metallic control member constitutes a blind electrode of a control condenser having electrodes 24, 25 provided on the tube wall, which control condenser is connected, for example, in parallel to the frequency-determining circuit of the local oscillator 6 and which has a value which is dependent upon the position of the control member 22 in the tube 21. In case of inaccurate tuning of the local oscillator 6, the tuned frequency detector 9 supplies demodulated signals to a mean direct-current component which differs from zero, thereby bringing about axial displacement of the control member and correction of the tuning frequency of the second local oscillator 6 until the mean direct-current component of the demodulated signals is reduced to zero. The correction is effected independently of variations in the frequency difference between the mark and space frequencies of the incoming signals, provided that the frequency range covered by the frequency detector is sufficiently large.

If, during a transmission interval, the mark frequency is received continuously, this would involve a variation, though very slow, of the desired tuning frequency of the local oscillator 6, which would lead to deformation of signals received after such an interval.

In order to avoid this disadvantage, the anode circuit of the triode 10, which is current-conveying when the mark frequency is received, includes an energizing winding 26 of a relay 28 comprising a short-circuit winding 27 and responding with a retardation of, say, 40 microsecs., thus not being capable of reacting upon the normal signalling rhythm of, for example, 50 Baud. However, during a signalling interval, triode 10 is continuously current-conveying and relay 28 is energized, so that a base contact 30 included in control-voltage lead 29 is opened and the energizing windings 19, 20 of the frequency corrector 18 become currentless. The control-member 22 then remains in the positions which happen to exist when the control-voltage lead 29 is interrupted, the tuning frequency of the local oscillator 6 thus not varying during a signalling interval.

When the above-described receiver is used at abnormally low signalling speeds, the relay 28 may be energized intermittently which may involve retardation of any necessary frequency corrections but which does not prevent them.

It is evident, that instead of utilizing the regulating motor described, use may be made of regulating motors of other type, for example, the so-called Ferrarie type, which start to rotate in one direction or the other as a function of the frequency correction to be performed. However, the frequency corrector is required to have no back-setting force. This is in contradistinction for example, to a reactance tube having a determined biasing voltage, since with such tubes the control reactance decreases to a fixed initial value in the absence of a control voltage.

While we have thus described our invention with specific examples and embodiments thereof, other modifications will be readily apparent to those skilled in the art without departing from the spirit and the scope of the invention as defined in the appended claims.

What I claim is:

1. A superheterodyne receiver for frequency-shift telegraphy signals having a given normal rate, said receiver comprising a mixer, a local oscillator coupled to said mixer, means to supply incoming signals to said mixer to produce an intermediate-frequency wave, a frequency detector coupled to the output of said mixer to demodulate said signals, an automatic-frequency-control system for said local oscillator including a frequency corrector coupled to said local oscillator and means coupled to said detector to derive a control-voltage therefrom and to apply same to said corrector, and a relay coupled to said detector and provided with a switch connected in said control system to interrupt said control-voltage when said relay is actuated and means for retarding the operation thereof to actuate only in response to an abnormal signal rate, said corrector being free of back-setting force whereby it retains the adjustment which exists at the moment the control voltage is interrupted.

2. A superheterodyne receiver, as set forth in claim 1, wherein said retarding means includes a short-circuit winding and wherein the retardation period of said relay is at least 10 microseconds.

3. A superheterodyne receiver, as set forth in claim 1, wherein said frequency corrector is constituted by a reactance controlled by a regulating motor, said control voltage being supplied to said motor to energize same.

4. A superheterodyne receiver, as set forth in claim 3, wherein said corrector is constituted by a fluid-filled tube having spaced electrodes on the outer wall thereof, a magnetic control member movably disposed within said tube, the position of said member determining the reactance formed by said electrodes, and a pair of series-connected magnetic windings disposed in proximity to said tube, said member and said windings forming said motor.

5. A superheterodyne receiver for frequency-shift telegraphy signals having a given normal rate, said receiver comprising a mixer, a local oscillator coupled to said mixer, means to supply incoming signals to said mixer to produce an intermediate-frequency wave, a frequency detector coupled to the output of said mixer to demodulate said signals, an automatic-frequency-control system for said local oscillator including a frequency corrector coupled to said local oscillator and means coupled to said detector to derive a control voltage therefrom and to apply same to said corrector, a relay coupled to said detector and provided with a switch connected in said control system to interrupt said control voltage when said relay is actuated and means for retarding the operation thereof only in response to an abnormal signal rate, said corrector being free of back-setting force whereby it retains the adjustment which exists at the moment the control voltage is interrupted, and a recording circuit coupled to the output of said detector and including a pair of electron discharge tubes each having a cathode, a grid and an anode, a recording pen magnet having a center-tapped winding, a voltage supply, a common resistor connecting the cathodes of both tubes to the negative terminal of said supply, the positive terminal thereof being connected to said center tap, means connecting the anode of one tube in series both with said winding and the retarded relay to the anode of the other tube, the grid of said one tube being connected to said negative terminal, the grid of the other tube being connected to the output of said detector.

References Cited in the file of this patent

UNITED STATES PATENTS

| | | |
|---|---|---|
| 2,507,735 | Peterson | May 16, 1950 |
| 2,541,128 | Violet | Feb. 13, 1951 |
| 2,561,041 | Arends et al. | July 17, 1951 |
| 2,601,436 | Hugenholtz | June 24, 1952 |
| 2,629,776 | Terry et al. | Feb. 24, 1953 |